United States Patent [19]

Boetto

[11] 4,452,318
[45] Jun. 5, 1984

[54] FOLDING FRAME IMPLEMENT WITH WING MOUNTED SUPPORT STAND

[75] Inventor: Charles Boetto, Naperville, Ill.

[73] Assignee: International Harvester Co., Chicago, Ill.

[21] Appl. No.: 313,891

[22] Filed: Oct. 22, 1981

[51] Int. Cl.³ .............................................. A01B 73/00
[52] U.S. Cl. .................................. 172/311; 172/466; 172/662; 172/776
[58] Field of Search ............... 172/311, 456, 466, 776, 172/662; 280/763, 764, 765, 766

[56] References Cited

U.S. PATENT DOCUMENTS

| | | | |
|---|---|---|---|
| 3,306,629 | 2/1967 | Oerman et al. | 280/764 X |
| 3,362,483 | 1/1968 | Twidale | 172/311 |
| 3,376,050 | 4/1968 | Lohrman | 172/311 |

Primary Examiner—Richard T. Stouffer
Assistant Examiner—William H. Honaker
Attorney, Agent, or Firm—Dennis K. Sullivan; F. David Au Buchon

[57] ABSTRACT

An implement having a tool equipped tool bar with a central horizontal section, a wing pivotally mounted to each end of the central section, a hydraulic cylinder mounted on the central section for each wing and connected with the wing to move the wing from a working position in general alignment with the central section to a folded storage, or transport position on the central section, a pair of spaced front support structures for the central section in the storage position and a support stand mounted on the wing, the support stand in the wing folded storage position extending downwardly and rearwardly of the tools to support the rear of the implement.

7 Claims, 3 Drawing Figures

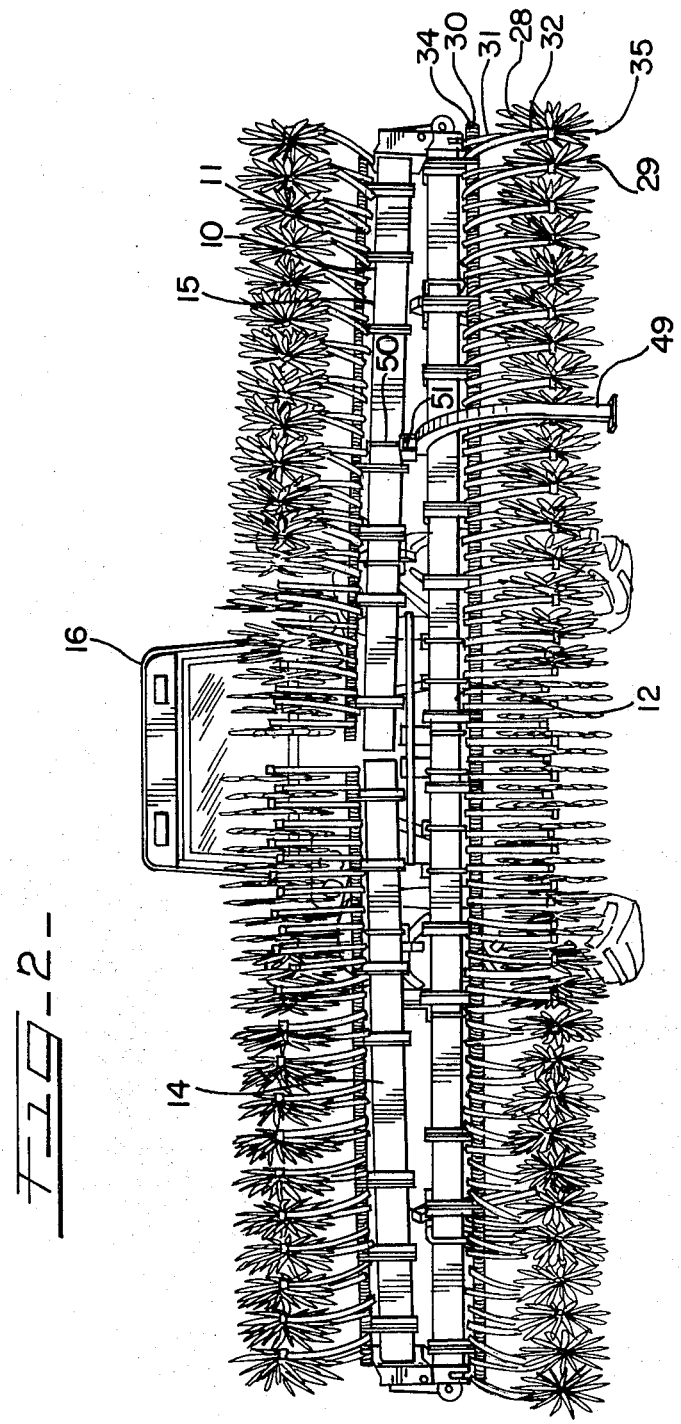

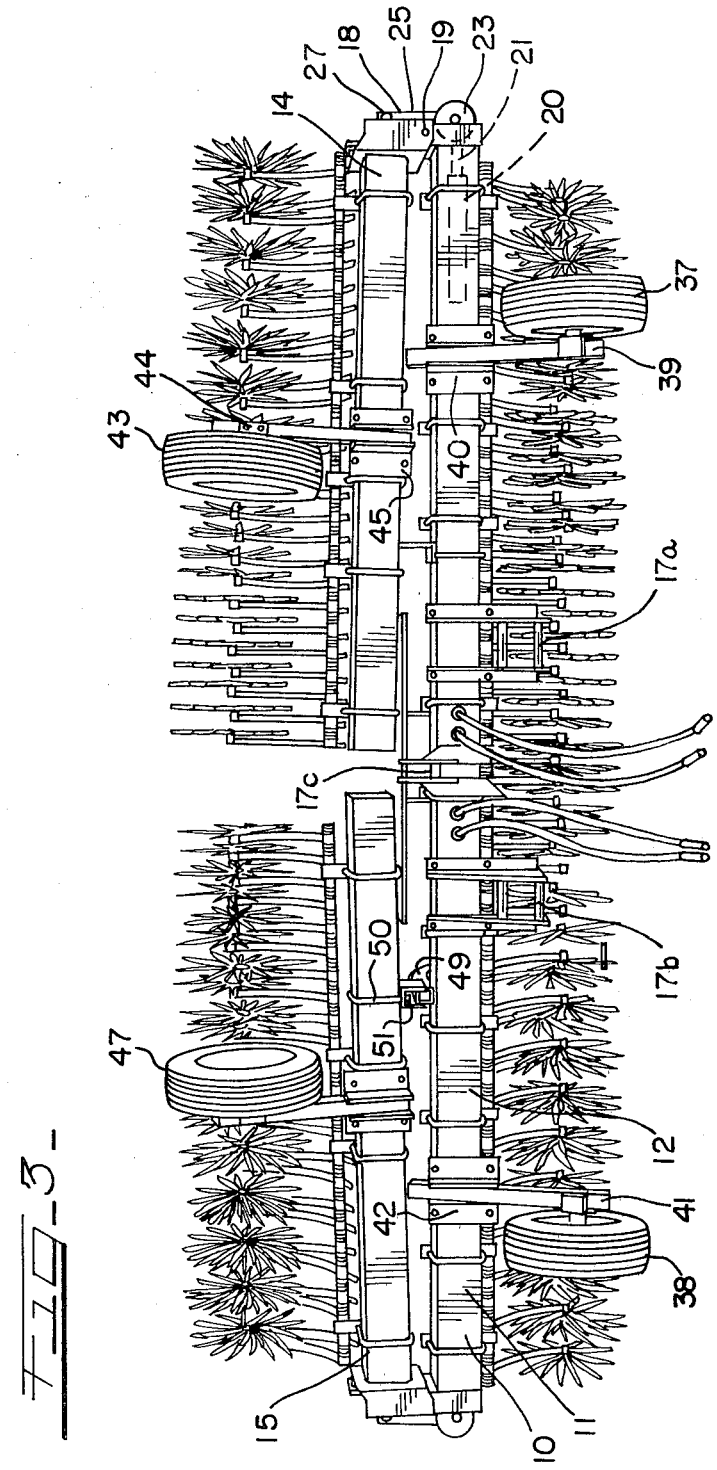

FOLDING FRAME IMPLEMENT WITH WING MOUNTED SUPPORT STAND

BACKGROUND OF THE INVENTION

1. Field of the Invention

This invention pertains generally to agricultural equipment.

2. Description of the Prior Art

Agricultural implements, which support a plurality of ground working tools, have frequently a rather lengthy, span which extends transversely to the direction of travel of the towing tractor in order to cultivate or otherwise work a large expanse of soil. For transport or storage the implement must be folded to a narrow configuration. The folding may be done in various ways. Probably the most common, however, is to provide a generally horizontal central section with a wing pivotally connected at each end of the central section and with each wing being foldable by a hydraulic cylinder about 180° from the working position to a position wherein the wing rests on top of the central section. This provides a narrow and low configuration that is simple and stable while also not restricting operator visibility in transport.

A problem arises when the operator desires to use the tractor for another purpose. The implement must be provided with suitable stands for storage that the operator must position by dismounting from the tractor, going to the rear of the folded implement, and pulling the stands down and fixing them in position by quick attachment pins, and then proceeding to the front of the implement and doing likewise with additional stands. Generally four or at least three stands are needed and located on the front and rear of the implement. The tractor can then be utilized to lower the implement preferably to rest on the stands with the tools out of contact with the ground, and then be driven away for use on other equipment.

The above procedure takes undue time and must be reversed when the implement is again placed into use.

SUMMARY OF THE INVENTION

Applicant, as a consequence, designed an implement that avoids the need for the operator to dismount from the tractor seat for the above-noted procedure. Specifically, Applicant provides a particular stand which is fastened to the top of a wing section when same is in the working position. The stand extends rearwardly from the wing, beyond the tools mounted thereon, and then upwardly. The upward length is preferably sufficient that it is more than the distance from the top of the implement central section to bottom of the tools mounted thereon. If spaced front carrying wheels mounted on the front of the implement are utilized, the operator only has to use the tractor to raise the implement including wings until the tools clear the ground and then fold, via the hydraulic cylinders, the wings to the storage position wherein the upward extending wing stand now automatically extends downwardly and rearwardly of the tools on the central section. The implement can now be lowered and the tractor disconnected, with the implement being supported by the central section carrying wheels in the front and the single wing stand in the rear. Normally only one wing stand—located between the two carrying wheels—is necessary in a tripod arrangement. Of course, a stand for the other wing could be provided also for longer tool bars.

Where no carrying wheels are utilized on the central section, the operator has to dismount and lower front stands after folding the wings. However, he does not have to go around the implement to the rear of same to lower the rear stand as same is automatically positioned on folding the wings. The stand, where same is attached to the wing, also provides a stop for the wing when same is folded. In the working position, the upwardly and rearwardly extending stand does not cause a problem as same is well inboard of the end of the wing.

It, is therefore, an object of this invention to provide a new and improved agricultural implement.

Another object of this invention is to provide an implement that when folded, automatically provides a rear stand.

BRIEF DESCRIPTION OF THE DRAWINGS

FIG. 2 is a rear view of the implement in the folded, storage position; and

FIG. 3 is a front view of the implement in the folded, storage position.

DESCRIPTION OF THE PREFERRED EMBODIMENT

Figure 1:
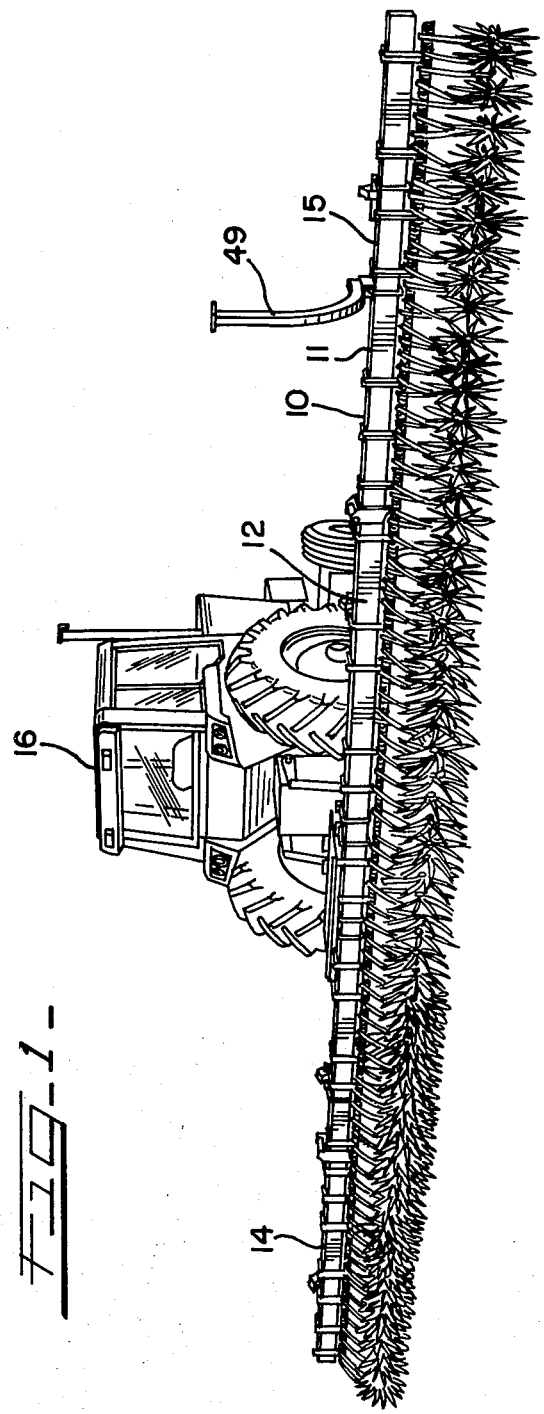
FIG. 1 is a perspective rear view of the implement in the working position.

Referring to FIGS. 1-3, 10 indicates an agricultural implement. Implement 10 includes a frame consisting of a tool bar 11 having a central section 12, a left wing 14 pivotally connected to one end of section 12 and a right wing 15 pivotally connected to the other end of section 12. The hand of the wings is determined when standing to the rear of tool bar 11 and looking forward to tractor 16 connected thereto. As shown in FIG. 3, tool bar 11 has lower brackets 17a and 17b and upper bracket 17c on the front thereof for a 3 point hitch connection to tractor 16.

Wing 14 (see FIG. 3) is connected to central section 12 by hinge 18 for movement about upper offset axis 19. Wing 15 is similarly connected to central section 12. Hydraulic cylinder 20 having rod end 21 is preferably located inside hollow central section 12 with rod end 21 pivotally connected to rollers 23 and to links 25 which in turn are pivotally connected to ear 27 attached to wing 14. Wing 15 is similarly connected to the other end of section 12. The cylinder-links arrangement provides the 180° fold capability shown in FIG. 1 to that shown in FIG. 3. Of course, other structure could be utilized to achieve the 180° fold and, if need be, the cylinder could be mounted outside the central section 12.

The implement shown in the Figures is a rotary hoe. Obviously, other ground working tools could be utilized thereby providing cultivator or the like operation. As shown, the rotary hoe arrangement consists of two rows of hoes (front 28 and rear 29) mounted on shaft 30. Front row 28 utilizes short arms 31 and rear row utilizes long arms 32. Each arm is individually biased until the upper arm stops contact the tool bar by use of springs 34. At the end of each hoe arm is rotary hoe wheel 35 rotatably mounted thereon. The hoe wheels are spaced along central section 12 and wings 14 and 15 and provide individual hoe action when in the working position of FIG. 1.

Also, a part of implement 10 and shown best in FIG. 3 are preferably spaced carrying wheels 37 and 38 on central section 12. Wheel 37 via holes in support arm 39 and bracket 40 is adjustably mounted on implement 10. Wheel 38 is similarly mounted via arm 41 and bracket 42. Wheels 37 and 38 are used to support central section 12 when same is of considerable length in the working position and help gauge tool depth. Left wing 14 also has carrying wheel 43 which is adjustably mounted in wing 14 by arm 44 having suitable holes for bracket 45 mounted on wing 14. Wing 15 also has carrying wheel 47 similarly mounted thereon. Wheels 43 and 47 provide a similar function for wings 14 and 15 in the working position as the central section wheels.

Implement 10 also includes stand 49. Stand 49 is preferably mounted on right wing 15 by U-bolt 50 and nuts 51. Stand 49 normally extends upwardly in the working position and rearwardly as shown in FIG. 1. When wing 15 is rotated to the transport or storage position of FIG. 1, stand 49 extends downwardly and rearwardly beyond the rearward extension of rear row 29 of hoe wheels 35. Preferably stand 49 has an enlarged base and has sufficient length to maintain the tools off the ground in conjunction with the front support means. As shown in FIG. 3, with the implement in the stored position with the tractor removed, carrying wheels 37 and 38 on the central section 12 and on the front thereof support the stored implement in conjunction with stand 49 on the rear of the implement as shown in FIG. 2. Normally only one stand, located between wheels 37 and 38, is required in a tripod support arrangement. For longer tool bars a similar stand could be mounted on left wing 14 for a four point support.

On smaller tool bars where wheels 37 and 38 are not required for working, straight stands adjustably mounted on the front of central section 12 may be utilized in place of wheels 37 and 38 to provide a three point support with stand 49. Of course, they would have to be manually manipulated to prepare the implement for working and storage. The operator would not have to manipulate stand 49, however.

In operation, with front mounted carrying wheels 37 and 38 utilized, the implement is as in FIG. 1. Preferably wing wheels 43 and 47 are also utilized although this would depend on the length of wing and also on flex or non-flex operation. Upon the completion of the hoeing, the operator would use the tractor to raise the tool bar to remove the tools from the soil and then actuate the wing cylinders to fold the wings to the position of FIG. 2, wherein the wings are approximately 180° from the working position. Here stand 49 also provides a stop with central section 12. Stand 49 now automatically extends rearwardly beyond the rear hoe wheels 35 and downwardly therefrom. When the tool bar is lowered, the implement now rests on carrying wheels 37 and 38 in the front of the tool bar and stand 49 with the tools carrying no load. The tractor can now be released at its 3 point connection and driven away for other use.

Upon again commencing hoeing, the tractor is again connected to the implement, the implement lifted and then the wings unfolded to the working position of FIG. 1 and the implement lowered to start the working process. The operator does not have to dismount from the tractor in either case to adjust stands.

Where front carrying wheels 37 and 38 are not utilized, the front stands in lieu thereof would have to be physically manipulated. However, (and as mentioned) the operator does not have to walk around to the rear of the folded implement to change the position of the rear stand as stand 49 is automatically positioned as desired by the folding of wing 14.

What is claimed is:

1. An agricultural implement comprising:
a frame having a tool bar adapted for connection to a tractor, said tool bar including a normally horizontal central section and at least one wing section pivotally connected to said central section about a generally horizontal axis for movement between a working position in general alignment with said central section and a folded storage position directly over said central section;
a hydraulic cylinder mounted on said central section;
means pivotally connected to said cylinder and to said wing section for moving said wing section between said working and storage positions upon cylinder actuation;
a plurality of ground working tools mounted on said central and wing sections;
a pair of spaced support means for said central section when said implement is in the storage position, said support means being located in front of the implement; and
a support stand mounted on said wing section, said support stand, in the folded storage position of said implement, extending from said wing section downwardly to the ground rearwardly of said implement and, in combination with said central section support means, independently supporting said implement and tools.

2. The implement of claim 1 in which said support stand is located between said pair of support means when said implement is in the folded position.

3. The implement of claim 2 in which, upon said wing being folded, said support stand extends rearwardly of and below said tools and is located closer to one support means than the other.

4. The implement of claim 3 in which said stand provides a stop for said wing on said central section in the folded storage position.

5. The implement of claim 3 in which said support means are carrying wheels, said carrying wheels also supporting said central section in the working position.

6. The implement of claim 5 in which said carrying wheels are adjustably mounted on said central section.

7. The implement of claim 6 further comprising a carrying wheel adjustably mounted on the front of the wing for supporting the wing in the working position.

* * * * *